US010823654B2

(12) United States Patent
McLean et al.

(10) Patent No.: US 10,823,654 B2
(45) Date of Patent: Nov. 3, 2020

(54) FALLING WEIGHT DEFLECTOMETER

(71) Applicant: Dynatest A/S, Ballerup (DK)

(72) Inventors: Jim Larsen McLean, Naestved (DK); Ben Cumming, Rosanna (AU); Jack Larsen, Hedehusene (DK); Albert Navarro Comes, Kongens Lyngby (DK)

(73) Assignee: Dynatest A/S, Ballerup (DK)

( * ) Notice: Subject to any disclaimer, the term of this patent is extended or adjusted under 35 U.S.C. 154(b) by 180 days.

(21) Appl. No.: 15/778,007

(22) PCT Filed: Dec. 16, 2015

(86) PCT No.: PCT/EP2015/080099
§ 371 (c)(1),
(2) Date: May 22, 2018

(87) PCT Pub. No.: WO2017/102000
PCT Pub. Date: Jun. 22, 2017

(65) Prior Publication Data
US 2018/0348107 A1    Dec. 6, 2018

(51) Int. Cl.
*G01N 3/303*    (2006.01)
(52) U.S. Cl.
CPC .................... *G01N 3/303* (2013.01)
(58) Field of Classification Search
CPC ...................................................... G01N 3/303
USPC ............................................ 73/12.04, 12.06
See application file for complete search history.

(56) References Cited

U.S. PATENT DOCUMENTS

| 4,583,027 A | 4/1986 | Parker et al. |
| 5,056,352 A * | 10/1991 | Muhrer ................. G01L 27/005 73/37 |
| 5,942,817 A | 8/1999 | Chitayat |
| 5,959,198 A * | 9/1999 | Pollok ...................... G01N 3/52 73/12.06 |
| 5,983,702 A * | 11/1999 | Ahn ..................... G01M 11/088 73/12.06 |
| 6,532,791 B2 * | 3/2003 | Schmid ................ H02K 41/031 324/202 |

(Continued)

FOREIGN PATENT DOCUMENTS

| CN | 2856134 Y | 1/2007 |
| CN | 101509856 A | 8/2009 |

(Continued)

OTHER PUBLICATIONS

Bohn, Axel O. "Faldloddets historie." *Asfalt* 112 (Sep. 1989).

(Continued)

*Primary Examiner* — Daniel S Larkin
(74) *Attorney, Agent, or Firm* — Harness, Dickey & Pierce, P.L.C.

(57) ABSTRACT

A falling weight deflectometer comprising a load plate adapted to engage a test surface, force transmission means adapted to transmit a force to the load plate, buffer means, and a drop weight. The drop weight is adapted to impact the force transmission means via the buffer means so as to provide a force to be transmitted to the load plate via the force transmission means. The falling weight deflectometer further comprises at least one linear electric motor for lifting the drop weight to a predetermined height above the force transmission means.

9 Claims, 6 Drawing Sheets

(56) References Cited

U.S. PATENT DOCUMENTS

| | | | |
|---|---|---|---|
| 7,617,718 B2* | 11/2009 | Kinast | G01N 33/24 73/84 |
| 2004/0200264 A1* | 10/2004 | Chen | G01N 3/303 73/12.06 |
| 2004/0221657 A1* | 11/2004 | Ebert | G01N 3/28 73/849 |
| 2009/0031783 A1* | 2/2009 | Fukushima | G01N 3/303 73/12.06 |
| 2016/0238501 A1 | 8/2016 | Madsen | |

FOREIGN PATENT DOCUMENTS

| | | |
|---|---|---|
| CN | 101978250 A | 2/2011 |
| DE | 9305327 U1 | 6/1993 |
| JP | 2007205955 A | 8/2007 |
| RU | 2488848 C1 | 7/2013 |
| RU | 142607 U1 | 6/2014 |
| WO | WO-2015/051798 A1 | 4/2015 |

OTHER PUBLICATIONS

European Office Action dated Mar. 21, 2019 issued in corresponding European Application No. 15813813.1.
Russian Office Action dated Apr. 8, 2019 issued in corresponding Russian Application No. 2018122788/28(036053).
International Search Report PCT/ISA/210 for International Application No. PCT/EP2015/080099 dated Sep. 5, 2016.
Ronald Rohner: "Designing with Linear Motor | Technologies content from Machine Design", Jun. 1, 2001 (Jun. 1, 2001), XP055298037, Retrieved from the Internet <URL:http://machinedesign.com/technologies/designing-linear-motor> [retrieved on Aug. 26, 2016].
Chinese Office Action dated Mar. 19, 2020 for corresponding Chinese Application No. 2015800885307.9.
"Modelling, Characteristic Analysis and Thrust Control of permanent Magnet Linear Synchronous Motor". pp. 1-23 and 222-233, Mar. 31, 2014.

* cited by examiner

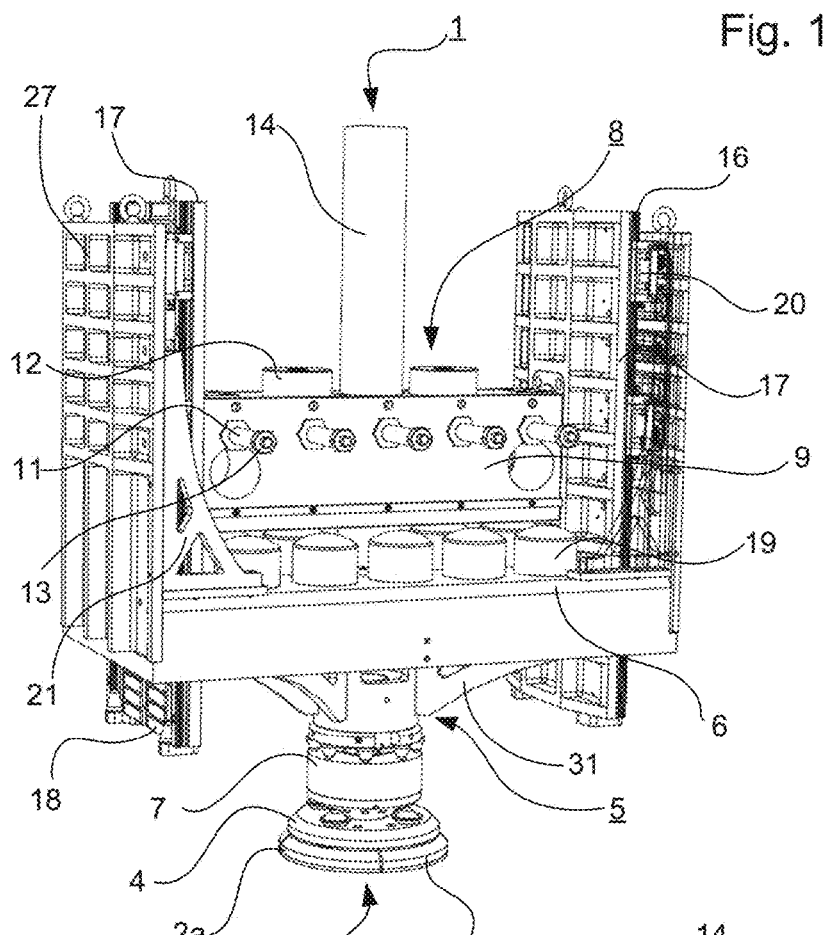
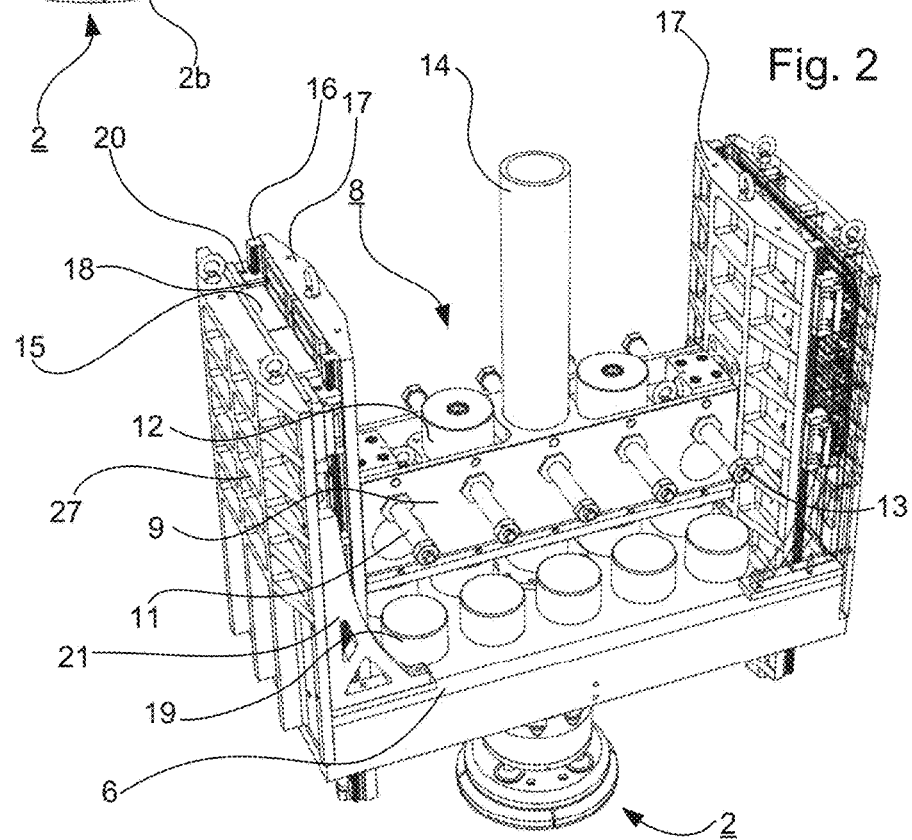

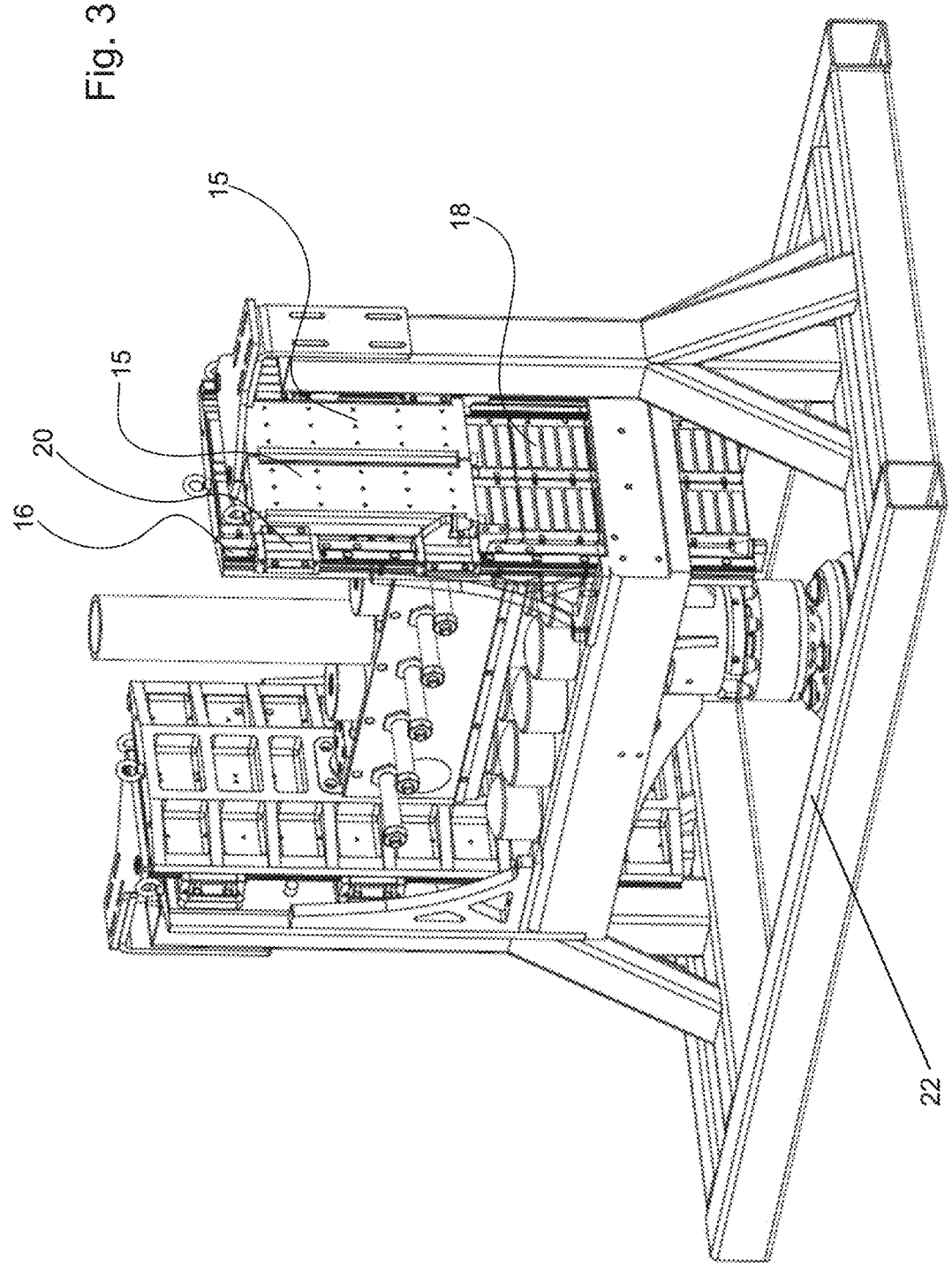

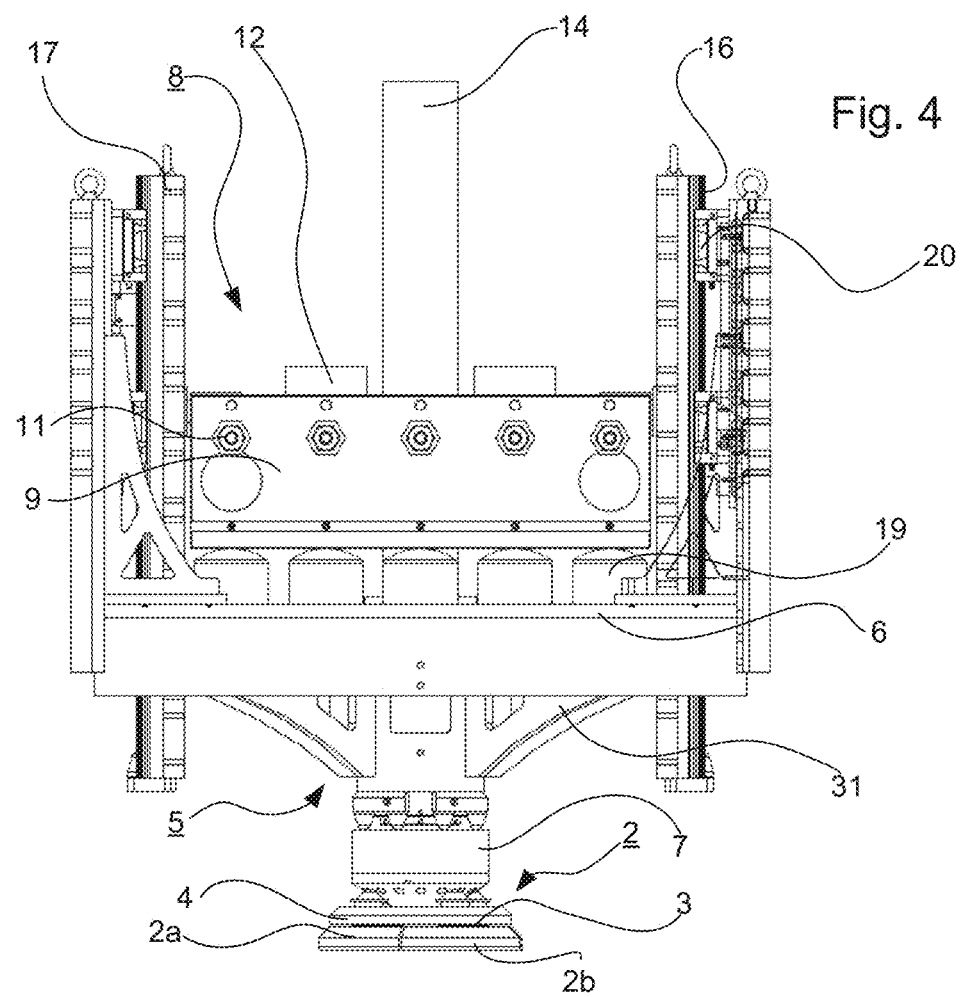
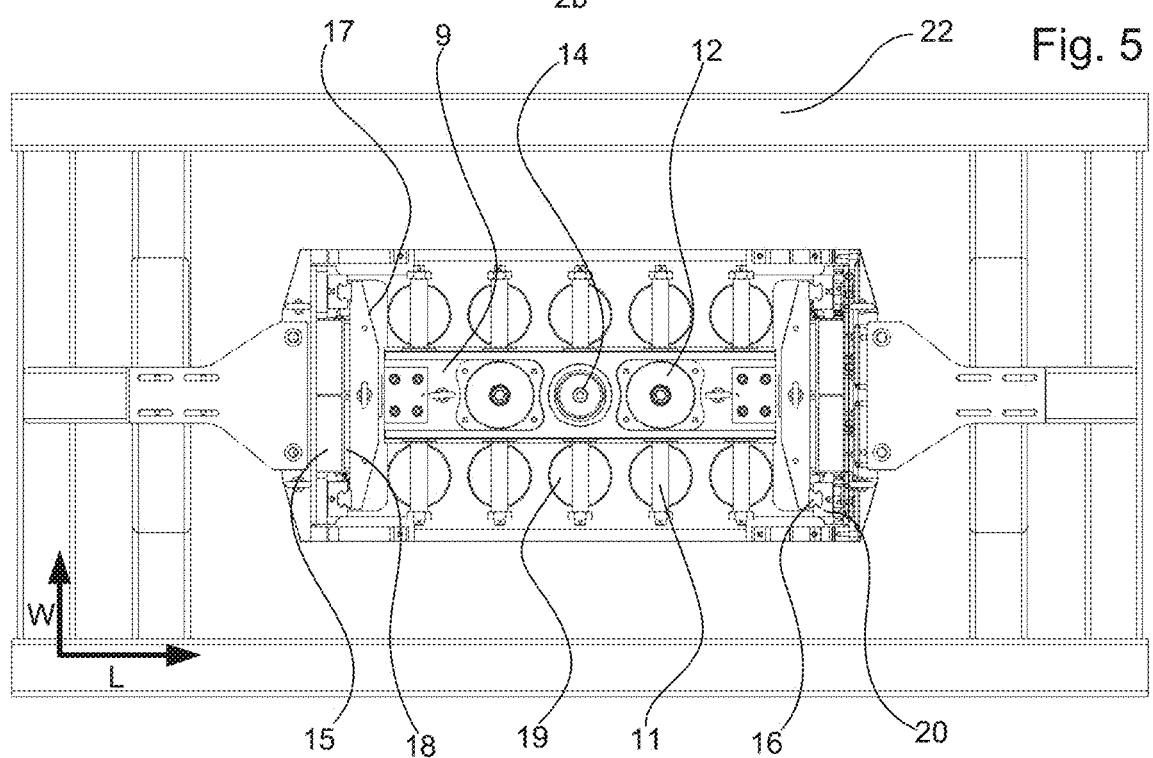

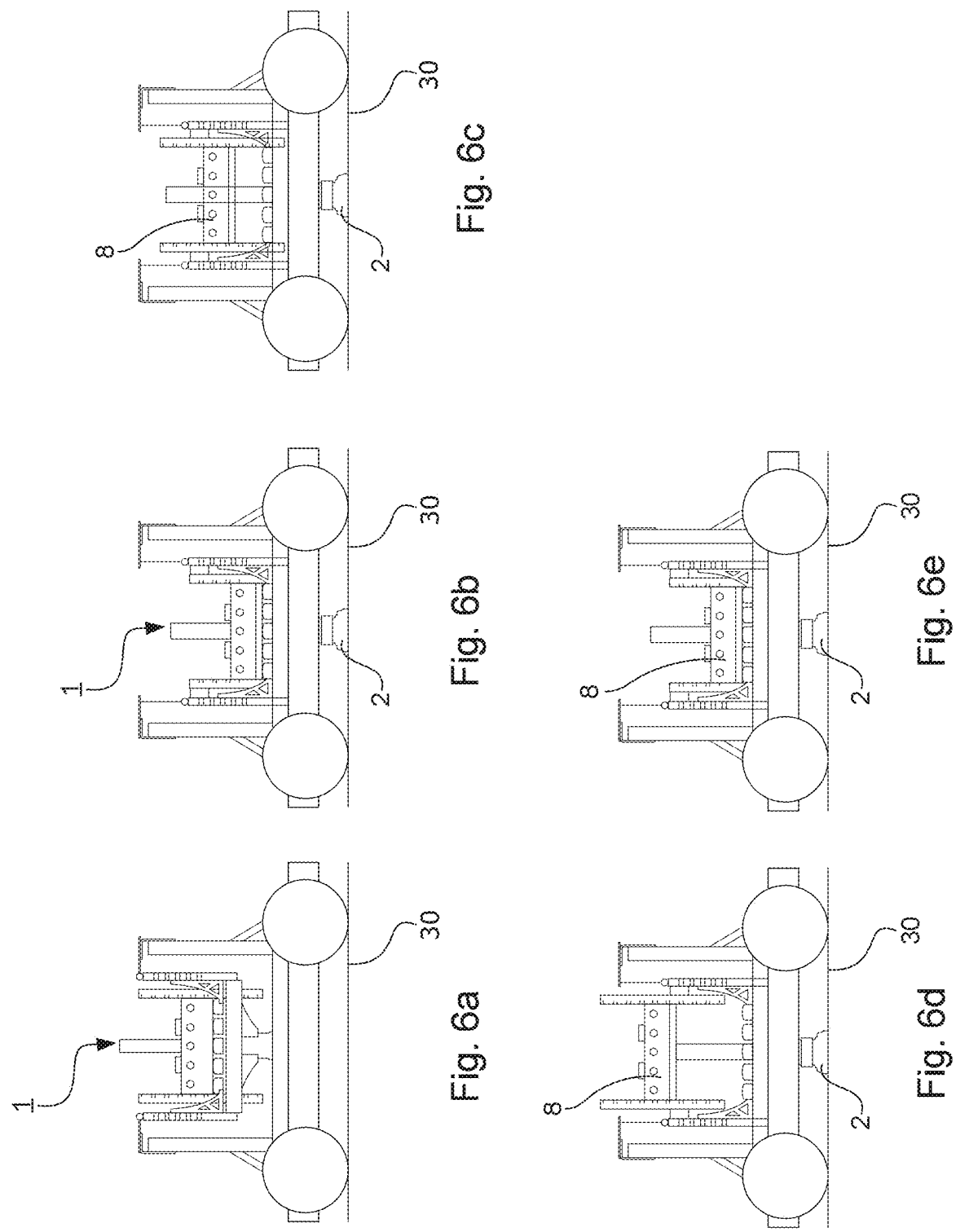

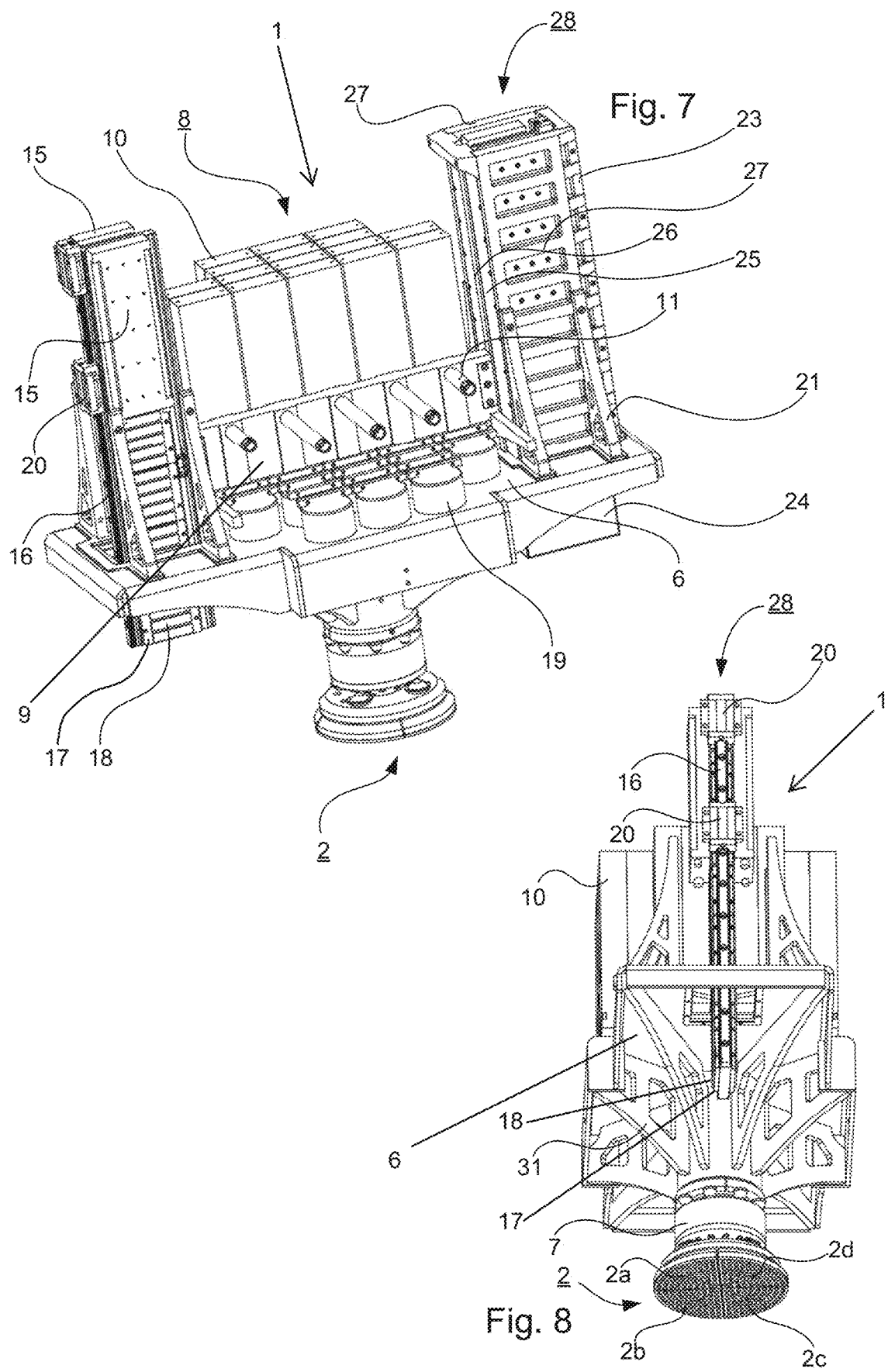

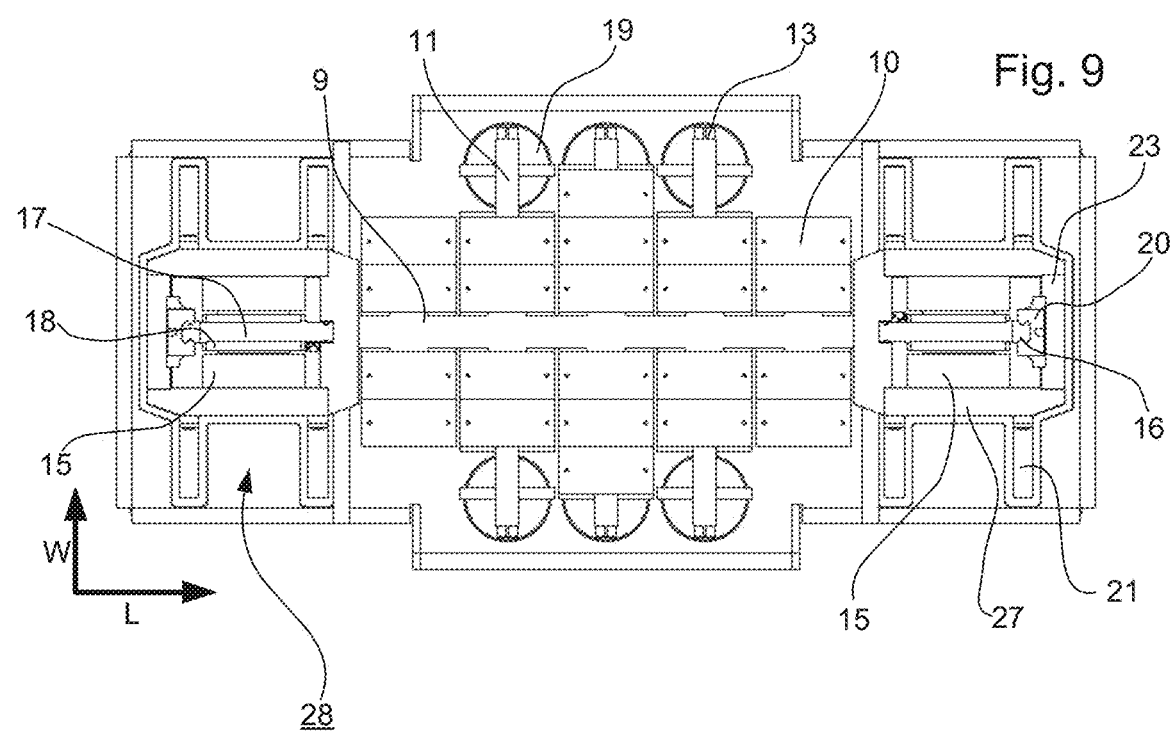

FALLING WEIGHT DEFLECTOMETER

CROSS-REFERENCE TO RELATED APPLICATIONS

This application is a national phase under 35 U.S.C. § 371 of PCT International Application No. PCT/EP2015/080099 which has an International filing date of Dec. 16, 2015, the entire contents of each of which are hereby incorporated by reference.

The present invention relates to a falling weight deflectometer.

A falling weight deflectometer (FWD) is a non-destructive testing device used by civil engineers to evaluate the physical properties of pavement structures. Data from the FWD is primarily used to estimate the load carrying capacity, of inter alia pavements comprising Portland cement concrete (PCC) or asphalt concrete (AC) surfaces. Use includes roads, airport pavements, container yards, and railway tracks. The falling weight deflectometer is typically integrated in a trailer that can be towed to a test location by another vehicle, but can also be integrated in the vehicle itself.

The falling weight deflectometer is designed to impart a load pulse to the pavement surface which simulates the load produced by a rolling vehicle wheel. The load is produced by dropping a large weight on a set of rubber buffers. The resulting force is transmitted to the pavement through a circular load plate. A load cell or other load sensing transducer is mounted atop the load plate and measures the applied load on the pavement surface. A series of deflection sensors such as geophones or accelerometers are mounted linearly along a beam extending from the centre of the load plate and measure the resulting pavement surface deflection in response to the load at a variety of distances from the centre of the applied load. The FWD data may be used to calculate stiffness-related parameters, e.g. Young's modulus of the layers of a multi-layered pavement structure, such as the pavements of roads or airports comprising PCC or AC.

Traditionally, in FWDs the weight is raised hydraulically along a vertical guide rod or column and held at a predetermined height by a catch mechanism until measurement is to be performed and a drop command is issued by the FWD operator. The catch mechanism is then released and the weight drops onto a force transmitting means, which includes a circular load plate of known diameter, which prior to the dropping of the weight has been lowered to make contact with the pavement surface at the desired measurement location. Between the force transmitting means and the weight an elastic means, e.g. buffers in the form of rubber blocks, is provided in order to create an ideally half-sinusoidal impact force to the pavement. The force transmitting means normally comprises a force sensing means so as to measure the actual impact force. Since the drop-weight mass is substantial, typically between 50 and 750 kg, the drop weight is normally picked up and lifted back to the latched position by a hydraulic lifting mechanism or the like. Examples of FWDs as described above are e.g. found in JP-A-2007-205955 and DE-U-9305327. Examples of such FWDs are also described in the article "Faldloddets historie", Bohn, Axel O., Asfalt, pages 4-11, September 1989, ISSN 0004-4318, describing the development of the falling weight deflectometer from 1964 to 1989.

One major drawback with such hydraulically operated FWDs is that a measurement cycle takes relatively long time, in particular if successive measurements are to be made at the same location. A major reason for this is that the process of the hydraulic lifting means being lowered to pick up the weight, raising the weight to the latch, and disengaging weight from the hydraulic lifting means is relatively slow. Moreover, after a few repetitive drops at one location, the load plate must be raised to the transport position and secured, and lowered again at the next measurement position. In the prior art, the latter is a major contributor to the long test cycles. When thousands of consecutive measurements are to be made along a road to be surveyed, accumulated durations of the processes reduce the efficiency of the overall survey.

In WO2015/051798 incorporated herein by reference, it is has been suggested to use an electric lifting mechanism. The electric lifting mechanism comprises a high-torque electric motor coupled directly to a threaded spindle. The weight to be lifted and dropped is in permanent engagement with the spindle in a wandering nut arrangement, allowing it to be lifted and dropped by energizing or de-energizing the electric motor, respectively. Though this electric lifting mechanism has proved very successful in reducing the cycle times of lift and drop cycles, it still has some drawbacks. Evidently, the permanent engagement between the weight and the threaded spindle with the electric motor is in some contradiction to the intention of a free fall of the drop weight, because during the fall of the weight rotation is imparted to the spindle and motor. Thus some of the potential energy is used to accelerate the rotation of the spindle and the motor. Furthermore, even with open terminals there may be a braking effect from the electric motor, acting during the drop as a generator. As explained in WO2015/051798, this braking effect then either has to be neglected or compensated for, the latter further complicating the control mechanism.

Based on this prior art it is the object of the invention to provide an FWD which overcomes the above drawbacks, while still providing at least the same advantages in cycle speed as the prior art FWDs.

According to the present invention this object is accomplished by a falling weight deflectometer comprising a load plate adapted to engage a test surface, force transmission means adapted to transmit a force to the load plate, buffer means, a drop weight adapted to impact said force transmission means via said buffer means so as to provide a force to be transmitted to said load plate via said force transmission means, guide means for guiding said drop weight towards said force transmission means, and lifting means comprising at least one electric motor for lifting said drop weight to a predetermined height above said force transmission means, wherein said at least one electric motor is a linear motor.

A falling weight deflectometer using a linear electrical motor as lifting means will comprise few movable parts compared to the prior art which uses either an electrical motor driving a spindle to lift the drop weight, or a traditional motor, such as hydraulic motor, and therefore removes most sources of internal friction in the motor. Additionally, linear electrical motors can provide a very fast acceleration and lift, even compared to other electrical motors. This in turn means that a full test cycle, i.e. a lift and a drop of the drop weight, may be carried out quickly, so that the FWD has to spend less time at each test site.

According to an embodiment of the invention said at least one electric motor comprises permanent magnets. By using permanent magnets to form the armature of the linear electrical motor, the device becomes easier to maintain, as there is no requirement for wiring, unlike with electromagnets. Furthermore, permanent magnets typically comes in pre-manufactured rows which makes the initial assembly of the FWD fast and cost efficient.

In a preferred embodiment the permanent magnets form part of said drop weight. By directly coupling the drop weight to the motor's moving part, i.e. the permanent magnets, the need for mechanical transmission elements such as lead screws, timing belts, rack and pinion, and worm gear drives is eliminated. Therefore, there is no mechanical wear resulting in excellent reliability and longer lifetime, and fewer mechanical parts minimize maintenance and reduce the system cost.

According to an embodiment of the invention, the lifting means comprises four linear electric motors. By providing additional and/or more powerful motors, the FWD will be able to lift heavier drop weights, thereby increasing the impacting force range in which the FWD can operate making it more versatile. By using four linear electric motors a symmetric lift can be provided when using a drop weight with two orthogonal symmetry axes, e.g. a linear electric motor lifting in each corner, such that no torque is created when lifting the drop weight.

According to an embodiment of the invention the drop weight comprises at least one linear encoder.

By employing a linear encoder, the position of the drop weight will be known at all times during the drop cycle. This, in combination with the high degree of precision and control provided by the linear electric motor, means that the motor can be re-engaged immediately after the drop weight have impacted the elastic buffers and bounced off, such as to be able to return to lift operation quicker and commence the next drop cycle. Besides allowing for a shorter drop cycle, this may be particularly useful during testing where the subsequent impacts of the bouncing drop weight are unwanted, as the linear electric motor can catch the drop weight after the first impact.

The present invention will now be described in greater detail based on preferred embodiments with reference to the drawings on which:

FIG. 1 shows a first schematic, perspective view of a falling weight deflectometer according to the embodiment;

FIG. 2 shows a second schematic, perspective view of a falling weight deflectometer of FIG. 1;

FIG. 3 shows a further schematic, perspective view of a falling weight deflectometer of FIG. 1 mounted in a support frame;

FIG. 4 shows a schematic side view of the falling weight deflectometer of FIG. 1;

FIG. 5 shows a schematic top view of the falling weight deflectometer of FIG. 3 mounted in a support frame;

FIGS. 6a-6e schematically show the lowering of the FWD load plate onto the surface and a subsequent lift and drop of the drop weight;

FIG. 7 shows a first schematic, perspective view of a falling weight deflectometer according to another embodiment of the invention;

FIG. 8 shows a second schematic, perspective view of a falling weight deflectometer of FIG. 7; and FIG. 9 shows a schematic top view of the falling weight deflectometer of FIG. 7.

Turning first to the perspective view of FIGS. 1 and 2, a first embodiment of the movable parts of the falling weight deflectometer 1 with linear electric motors 15 according to the invention is shown.

Throughout the description, when referring to directions, the falling weight deflectometer 1 will be described as having a longitudinal direction L with two ends and a transversal direction W with two sides, as shown in FIGS. 5 and 9. Furthermore, the directions upwards and downwards will refer to the orientation of the falling weight deflectometer 1 during use.

As to the linear electric motor 15 it comprises both a stator, which is generally static, and an armature, which is generally movable. This convention is followed in the following description. Moreover, as will be clear the stator generally understood as the component which generates the controlled magnetic field, which, in turn, causes the armature to move.

As can be seen, the falling weight deflectometer 1 comprises a drop weight 8 adapted to be lifted and dropped to create a desired impact. The drop weight 8 comprises an elongated main body 9 which extends along the longitudinal direction. The main body 9 has a lower impact surface adapted for impacting a load transfer plate 6. On the main body 9, two weights 12 can either be mounted or removed to define the minimum weight of the drop weight 8. The drop weight 8 further comprises a number of bars 11 extending laterally outwards in the transverse direction from the main body 9. In order to achieve a desired amount of weight for a test to be performed, additional removable weights 10 (not shown in FIGS. 1 to 6) may be mounted on the laterally extending bars 11.

The weight of each of the removable weights 10 is preferably adapted for manual handling, and the drop weight 8 may thus comprise a substantial number of removable weights 10 stacked besides each other, typically to achieve a total weight of drop weight 8 of up to about 750 kg. When mounted, the removable weights 10 will extend downwards to align with the lower impact surface of the main body 9, such that the removable weights 10 form part of the impact surface. In order to secure the removable weights 10 on the main body 9, securing means, such as nuts 13, may be provided at the end of the laterally extending bars 11.

Between the load transfer plate 6 and the drop weight 8 a number of elastic buffers 19 are provided. In the embodiment shown, the elastic buffers 19 are mounted on top of the load transfer plate 6, but the skilled person will realize that the elastic buffers 19 could also be mounted on the bottom of the drop weight 8, i.e. below the drop weight 8. The elastic buffers 19 are provided in order to cushion the impact and obtain a suitable sinusoidal half-wave shaped impact force in the impact as mentioned above.

The elastic buffers 19 are preferably arranged in rows across the transverse direction of the load transfer plate 6, such that a row of elastic buffers 19 is located immediately below the main body 9 and additional rows of elastic buffers 19 are located below the laterally extending bars 11, such that the additional rows will be impacted by the removable weights 10 mounted on the laterally extending bars 11. Through this arrangement, the number of the elastic buffers 19 which is utilized will depend on the amount of removable weights 10 mounted on the drop weight 8.

The elastic buffers 19 are preferably made of rubber, and are preferably interchangeable, allowing their number, their size, elastic properties etc. to be varied in accordance with a given desired amount of weight of the drop weight 8, and desired pulse width of the sinusoidal half-wave.

The shape of the impact pulse can furthermore be customized by changing the weight of the drop weight 8, the drop height, the buffers 19, i.e. replacing the buffers with others of a different elasticity and/or changing the number of buffers 19, or by using the motors 15, which will be described below, to accelerate the drop weight 8, i.e. braking or accelerating the drop. By using one or a combination of these, the impact pulse can be customized in order to simulate certain types of loads. For example, a wider impact pulse with a smaller peak force may be achieved by braking the drop using the linear electric motor 15 to simulate a longer lasting load on the test surface 30.

From the load transfer plate 6, the shaped impact force is transferred to a test surface 30 (shown in FIGS. 6a to 6e only), such as a pavement of e.g. Portland cement concrete or asphalt concrete, via force transmission means comprising inter alia a support column 5, and a load plate 2 adapted to engage the test surface 30. The load plate 2 is preferably circular and may, as can be seen from FIGS. 1 and 8, be segmented. In the preferred embodiment there are four segments 2a, 2b, 2c, 2d, as shown in FIG. 8, of which only two segments 2a, 2b are clearly visible in FIG. 1.

Evidently, any suitable number of segments including one, i.e. a single circular load plate 2, may be used. As best seen in FIG. 4, the segments 2a, 2b of the load plate 2 are connected via spacers 3 to an intermediate plate 4, allowing each of the segments 2a, 2b, to have a small degree of freedom in order to allow the overall load plate 2 to accommodate irregularities of the test surface 30, even if the test surface 30 is not entirely plane or horizontal. The intermediate plate 4 and the load cell 7, which are rigidly connected, preferably also has some degree of freedom with respect to the support column 5 in order to adapt to inclinations in the test surface 30.

The intermediate plate 4 is connected to the load transfer plate 6 via further support means 31 forming part of the support column 5. The further support means also includes a force transducer 7, such as a load cell, adapted to measure the forces in the impact of the falling drop weight 8 onto the load transfer plate 6 via the elastic buffers 19.

In the shown embodiment, the drop weight 8 is guided along a central guide column 14 secured to the load transfer plate 6, thus guiding the up and down motions of the drop weight 8 when it is dropped or lifted.

The drop weight 8 furthermore comprises two vertical armature mounting elements 17 (e.g., plates), i.e. one at each end. To form the armatures of the linear electric motors 15, the drop weight 8 preferably comprises two sets of permanent magnets 18 positioned on each armature mounting element 17, i.e. four sets in total. These sets of permanent magnets 18 forming the armatures of the linear electrical motors 15 are arranged in vertical rows with alternating polarities. Through this arrangement, the magnetizable coils (not shown) associated with the stators of the linear electric motors 15 can act directly on the drop weight 8 without any movable parts other than the drop weight 8 itself. In particular the permanent magnet armature on the drop weight 8 obviates the need of any flexible electrical cables or wires having to be drawn to the drop weight 8.

The two vertical armature mounting elements 17 are furthermore provided with a pair of guide rails 16. The guide rails 16 are accommodated in and guided by corresponding linear bearings in the form of tracks 20, such as to allow mutual reciprocating sliding motion between the drop weight 8 and the remainder of the falling weight deflectometer 1. The tracks 20 are mounted on respective motor mounting plates 27 carrying the stators of the linear electric motors 15 and forming part of motor towers 28. The mounting plates 27 are supported by the load transfer plate 6 and stabilized by generally triangular support elements 21 which reinforces and supports the position of each motor mounting plate 27 with respect to the load transfer plate 6.

The tracks 20 preferably have a cross section which is complementary to the cross section of the guide rails 16 and allows the guide rails 16 to stay in the tracks 20, e.g. a dovetail arrangement or a similar undercut arrangement. Smooth sliding is secured by the use of lubricant, such as grease, but evidently other means such as ball bearings may be provided in order to allow smooth sliding motion of the drop weight 8. Apart from guiding the drop weight 8, the cooperating tracks 20 and guide rails 16 secure the air gap in a number of linear electric motors 15 used for lifting the drop weight 8. The backs of the linear electric motors 15 are best seen in FIG. 3 where the motor cover has been removed for illustration purposes.

The linear electric motors 15 are preferably linear motors such as LMA22-100 available from the firm ETEL S. A., Zone Industrielle, CH-2112 Motiers, Switzerland, and associated motor controllers from the same firm. These motors are able to deliver 3650 newtons of force in peak and thus well capable of lifting and holding the drop weight 8 of the falling weight deflectometer 1. The use of such linear electric motors 15 allows a shorter lifting time as compared to the prior art falling weight deflectometer driven by a rotary electrical motor and a spindle, in turn already being much faster than traditional hydraulic lifting. The lifting times are substantially below 1 s for a 400 mm lift, and in fact comparable to the free fall time of approximately 0.285 s for the corresponding 400 mm drop.

For high mobility in practical use, the falling weight deflectometer 1 is mounted on a suitable carriage, such as a trailer or a vehicle, known per se and shown schematically in FIGS. 6a-6e. Cf. also the various illustrations in the above-mentioned article "Faldloddets historie" incorporated herein by reference. The power consumption of the falling weight deflectometer is not substantial, but it may exceed what the built-in generator of the towing vehicle can provide. Accordingly, the electrical power for driving the linear motors 15 may be provided by an additional generator. This may be by an additional generator on the vehicle on which the falling weight deflectometer 1 is mounted and/or by which it is towed. In case of the falling weight deflectometer 1 being on a towed trailer, the electrical generator may thus be located on the trailer to ensure autonomy.

Though not shown in FIGS. 1, 2, 4, 7, 8, and 9, the falling weight deflectometer 1 may be mounted in a frame in order to facilitate handling and transport. The frame 22 may be mounted on or form an integral part of a carriage with wheels as schematically illustrated in FIGS. 6a-6e, such as a trailer or a self-propelled vehicle.

FIG. 3 shows another perspective view of the falling weight deflectometer 1 shown in FIGS. 1 and 2 mounted in a support frame 22 and with the motor cover removed for illustration purposes to reveal the linear electrical motors 15. FIG. 5 shows a schematic top view of the falling weight deflectometer 1 of FIG. 3 mounted in the support frame 22. In the shown embodiment the falling weight deflectometer 1 comprises a total of four linear electrical motors 15, two on each side of the drop weight 8. Evidently, any suitable number of linear electrical motors 15 may be used depending on the strength of said linear electrical motors 15 and the impact force which the falling weight deflectometer 1 is required to produce.

This arrangement wherein the energizable coils of the linear electrical motors 15 are placed on the static body of the falling weight deflectometers 1 and the armatures are placed on the drop weight 8 in the form of using permanent magnets 18 is advantageous because the drop weight 8 is independent of any wiring, that would need to flex and be prone to breaking.

Turning now to FIGS. 6a-6e, the falling weight deflectometer 1 is shown mounted in a support frame, and for mobility in practical use, the falling weight deflectometer 1 is mounted on a suitable carriage such as a trailer or a vehicle so that it may easily be transported to a test site. Upon arrival to the test site the falling weight deflectometer 1 is lowered and the load plate 2 brought into engagement with the test surface 30. From the situation of FIG. 6*b* the drop weight 8 may be lifted to the drop position shown in FIGS. 6*c*-6*d*, i.e. the height which will produce the desired impact force, by the linear electric motor 15 acting upon the permanent magnets 18 of the drop weight 8, at which position the linear electric motors 15 are disengaged, i.e. de-energized, and the drop is performed. To control the lifting height, linear encoders may be provided on the drop weight 8, e.g. in conjunction with the permanent magnets 18, so as to communicate lifting height to the motor controller.

Because the linear electric motors 15 are in permanent magnetic engagement with the drop weight 8, there will inevitably be some braking force because the linear motors 15 act as generators during the drop. Since, however, the linear electric motors 15 normally have open terminals during the drop, the induced energy cannot be dissipated, and there are almost no electrical losses. As is well known, the voltage over the open terminals will increase dramatically, due to the back-EMF induced, and it may in some occasions be necessary to protect the control electronics against these excessive voltages. The control electronics therefore includes protective means for short circuiting the terminals with a suitable resistance value to reduce the voltage. This is however only in extreme cases, and even in those cases the braking force is very small and can be neglected, unless a very low drop height and/or very little weight is used to provide the impact force. In any case this may be compensated by energizing the linear electric motors 15 slightly during the drop to counteract the inherent braking by the induction of the motor.

In this respect, the skilled person will understand that the electric motors may also be actively energized to support the drop or even accelerate it to more than 1G. That is to say, rather than simply compensating for the almost non-existent braking of the drop weight 8, the linear electric motors 15 can also be energized further to produce an accelerated drop of the drop weight 8 with increased impact force. However, this will lead to increased power consumption, and increased need for cooling of the linear electric motors 15 and the controller. Nonetheless, the falling weight deflectometer 1 according to the present invention is in fact not restricted to free falls. Instead of free fall a higher or lower downward acceleration than the acceleration in free fall may be provided. One use for this could be shaping the impact, if rather than disengaging the linear electric motor 15 when dropping the drop weight 8, as suggested above, the linear electric motor 15 maintains engaged to control the force during an impact. All of the above may be controlled electrically and therefore renders itself to automation, without other manual intervention than e.g. the pushing of a few buttons.

As will be understood the purpose of the falling weight deflectometer 1 is to test a paved surface, i.e. the test surface 30. To provide useful data, the force of the impact on the test surface 30 is measured using sensors, such as the load cell 7 integrated in the falling weight deflectometer 1, in particular in the support column 5 of the falling weight deflectometer 1. Further external sensors such as geophones, accelerometers or the like sensors for detecting deflections are being positioned at predetermined distances from the impact centre. For this the falling weight deflectometer 1, e.g. by mounting the sensors on a rigid beam (not shown) which can be lowered from the frame of the falling weight deflectometer 1 in order to be brought into contact with the surface, so that the sensors may record the deflections created by the known impact on the pavement.

The sensors used to acquire data may thus include geophones, accelerometers, lasers, cameras, or a combination hereof. The acquired data may be stored locally in an integrated hard drive, or it may be transmitted for remote storage or processing.

After impact, the linear electric motor 15 may be re-energized to return to lift the drop weight 8 to the drop position to start the next drop cycle. When a suitable number of drop cycles have been made at the test site, the falling weight deflectometer 1 is lifted from the test surface 30 and secured in a transport position.

Turning now to FIGS. 7 and 8, another more compact embodiment of the falling weight deflectometer 1 according to the invention is shown. In this more compact embodiment of the falling weight deflectometer 1, the central guide column 14 has been omitted, allowing the main body 9 (shown in FIG. 7 and obscured by the load transfer plate 6 in the view of FIG. 8) of the drop weight 8 to be made thinner and more compact. This makes the general construction lighter and allows for a lower minimum drop weight. On the other hand, the narrower body allows the laterally extending bars 11 to be made longer, in turn, allowing additional rows of removable weights 10 to be mounted. This allows the drop weight 8 to achieve a greater maximum weight, and therefore an increased maximum impact force. Allowing a lower minimum weight and higher maximum weight increases the versatility of the falling weight deflectometer 1, as impacts in a greater force range may be achieved. Alternatively, if the extra rows of removable weights 10 are unnecessary, the falling weight deflectometer 1 may be purpose built with a reduced width to make it more compact.

In FIG. 7, the removable weights 10 have been removed from one side of the drop weight 8 for illustrative purposes. During operation, the removable weights 10 should preferably be mounted symmetrically on the drop weight 8, e.g. as shown in FIG. 9 where most of the weights 10 are mounted, such that the linear electric motors 15 and the guide rails 16 would not experience any torque which would damage the falling weight deflectometer 1 over time.

A motor tower 28 housing linear electric motors 15 is placed at each of the opposite ends of the drop weight 8. The motor towers 28 are identical mirror-images of each other. Each motor tower 28 comprises two motor mounting plates 27 for mounting the linear electric motors 15, a guide mounting plate 23 for mounting guides, and covers 24, 25 for shielding the inside of the motor tower 28. In FIGS. 7 and 8, the covers 24, 25 and mounting plates 27, 23 have been removed from one of the motor towers 28 in order to show the internal design.

Each motor mounting plate 27 extends vertically upward from the load transfer plate 6 and is attached to the load transfer plate 6 using two generally triangular support elements 21 which reinforces and supports the position of each motor tower 28 with respect to the load transfer plate 6. The motor mounting plates 27 of each motor tower are placed parallel to the longitudinal direction and facing each other, such that they form two opposite sides of the motor tower 28. Extending between them is a guide mounting plate 23 which forms an end of the motor tower 28 and serves as a mounting element for guide elements 16, 20 of the drop weight 8.

The fourth side, which is the side facing the main body 9, of each motor tower 28 is partially shielded by a cover 25 with a vertical slit 26 extending substantially the entire height of the motor tower 28 to allow the drop weight 8 to extend into the motor tower 28 and move freely along the slit during lift and drop of the drop weight 8.

Inside each motor tower 28, a pair of two linear electric motors 15 is mounted on the motor mounting plates 27, i.e. one linear electric motor 15 on each motor mounting plate 27. The pair of linear electric motors 15 is mounted such that the magnetizable coils of linear electric motors 15 are orientated towards each other with a gap, which can accommodate the armatures for the linear electric motors 15 between them.

The linear electric motors 15 are mounted at the ends of the load transfer plate 6. More specifically, to allow the length of the rows of permanent magnets 18 to extend both below and above the load transfer plate. Extending above the load transfer plate not only extends the maximum drop height of the drop weight 8, but also ensures that the magnets 18 of the armature always overlaps all poles of the stator. If there is not a full overlap between the armature magnets and the stator poles, the lifting force would be reduced, and the linear electric motor 15 would possibly not be able to lift all weights as desired.

At both ends, the main body 9 of the drop weight 8 extends through the slit 26 into the motor tower 28 where it is connected to an armature mounting element 17. The armature mounting element 17 extends vertically in the motor tower 28 through the gap between the linear electric motors 15 and is parallel to the motor mounting plates 27. A set of magnets 18 is arranged in a vertical row on both sides of the armature mounting element 17, such that each set of magnets 18 has an exposed surface facing the magnetizable coils of the stator of a linear electric motor 15 so as to form the armature for the respective linear electric motor 15, i.e. the armatures are sandwiched between the two stators so that the armatures can move vertically within the gap between the stators.

The armature mounting element 17 and the sets of magnets 18 mounted thereon extend vertically downwards through an opening in the load transfer plate 6, so as to allow the sets of magnets 18 to be made longer, i.e. allow more magnets in each vertical row, in order to extend the maximum drop height. Alternatively to extending the sets of magnets 18 through the load transfer plate 6, the motor tower 28 could be made taller, so that the linear electric motors 15 can be mounted higher, but this would require additional reinforcement to support the motor tower 28. Below the load transfer plate 6, around each of the openings which the armature mounting elements 17 and the sets of magnets 18 extend through, a cover 24 has been provided to shield the armature and protect the operator of the falling weight deflectometer 1 from moving parts during use.

The symmetry of the motor tower design is advantageous, as it allows the horizontal forces subjected on the two set of magnets 18 by their respective linear electric motors 15 to cancel out against each other. This reduces the strain put on mounting elements 17, 27, 23 and the guides 16, 20.

As can be seen in FIGS. 8 and 9, the drop weight 8 further comprises a guide rail 16 at each end. This is a further advantage of the symmetry of the motor tower 28, as one guide rail 16 can maintain the air gap for both linear electric motors 15. The guide rails 16 are guided by a pair of tracks 20 mounted inside the motor tower 28 on the guide mounting plate 23. The tracks 20 of each pair of tracks 20 are vertically spaced, such as to ensure that the guide rail 16 remains vertical during operation. The tracks 20 can of course be mounted on drop weight 8 and the guide rail 16 on the motor tower, which would achieve the same guiding effect.

The present invention has now been described based on exemplary embodiments. The skilled person, however, will realize that numerous other embodiments and variations as well as applications of the invention are possible without deviating from the scope of the claims. In particular, he will understand that the construction of the force transmission means, including the column 5 and the intermediate plate 4, or of the load plate 2 may differ from the examples. Moreover, the skilled person will realize numerous other ways of using the falling weight deflectometer 1 in terms of shaping of the impact and measurements for which it may be used.

The invention claimed is:

1. A falling weight deflectometer for evaluating physical properties of pavement structures, the falling weight deflectometer comprising:
   a load plate adapted to engage a test surface;
   force transmission means adapted to transmit a force to the load plate;
   buffer means;
   a drop weight adapted to impact said force transmission means via said buffer means so as to provide the force to be transmitted to said load plate via said force transmission means;
   guide means for guiding said drop weight towards said force transmission means; and
   lifting means comprising two or more electric motors for lifting said drop weight to a predetermined height above said force transmission means;
   wherein said two or more electric motors are linear motors, and the linear motors are arranged in two motor towers placed at each of opposite ends of the drop weight.

2. The falling weight deflectometer according to claim 1, wherein one or more electric motors of the two or more electric motors comprises permanent magnets.

3. The falling weight deflectometer according to claim 2, wherein said permanent magnets form a part of said drop weight.

4. The falling weight deflectometer according to claim 1, wherein the lifting means comprises four electric motors.

5. The falling weight deflectometer according to claim 4, wherein the drop weight comprises at least one linear encoder.

6. The falling weight deflectometer according to claim 1 wherein the drop weight comprises at least one linear encoder.

7. The falling weight deflectometer according to claim 1, wherein a total weight of drop weight is equal to or less than 750 kg.

8. A method, comprising:
   operating two or more electric motors in a falling weight deflectometer to evaluate physical properties of pavement structures, the falling weight deflectometer including
   a load plate adapted to engage a test surface;
   force transmission means adapted to transmit a force to the load plate;
   buffer means;
   a drop weight adapted to impact said force transmission means via said buffer means so as to provide the force to be transmitted to said load plate via said force transmission means; and guide means for guiding said drop weight towards said force transmission means;

wherein said two or more electric motors are linear motors and the linear motors are arranged in two motor towers placed at each of the opposite ends of the drop weight; and wherein the operating the two or more electric motors causes lifting of said drop weight to a predetermined height above said force transmission means.

9. The method according to claim 8, wherein a total weight of drop weight is equal to or less than 750 kg.

* * * * *